US012006750B2

(12) United States Patent
Kashiwaguma et al.

(10) Patent No.: US 12,006,750 B2
(45) Date of Patent: Jun. 11, 2024

(54) HINGE HAVING DAMPER AND COIL SPRING

(71) Applicant: SUGATSUNE KOGYO CO., LTD., Tokyo (JP)

(72) Inventors: Kazuaki Kashiwaguma, Tokyo (JP); Yukihiko Ogawa, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 147 days.

(21) Appl. No.: 17/595,361

(22) PCT Filed: Apr. 17, 2020

(86) PCT No.: PCT/JP2020/016913
§ 371 (c)(1),
(2) Date: Nov. 15, 2021

(87) PCT Pub. No.: WO2020/230521
PCT Pub. Date: Nov. 19, 2020

(65) Prior Publication Data

US 2022/0195769 A1 Jun. 23, 2022

(30) Foreign Application Priority Data

May 16, 2019 (JP) ................................ 2019-092693

(51) Int. Cl.
*E05D 11/02* (2006.01)
*E05D 3/16* (2006.01)

(52) U.S. Cl.
CPC ................ *E05D 3/16* (2013.01); *E05D 11/02* (2013.01)

(58) Field of Classification Search
CPC .. E05D 3/14; E05D 3/142; E05D 3/16; E05D 2003/166; E05F 3/20
(Continued)

(56) References Cited

U.S. PATENT DOCUMENTS 3,611,474 A * 10/1971 Meyer ........................ E05D 3/18 16/370
10,221,597 B2 * 3/2019 Hammerer .............. E05F 5/006
(Continued)

FOREIGN PATENT DOCUMENTS

JP 2013-159965 A 8/2013
JP 2016-133213 A 7/2016
(Continued)

OTHER PUBLICATIONS

Extended European Search Report/EPO, Extended European Search Report dated Dec. 23, 2022 in European Patent Application No. 20805881.8, 7 pages with translation.
(Continued)

*Primary Examiner* — Emily M Morgan
(74) *Attorney, Agent, or Firm* — MASUVALLEY & PARTNERS; Peter Martinez

(57) ABSTRACT

A hinge device includes a first hinge body 10, a second hinge body 20 and a link mechanism 6. The link mechanism includes a moving link 30 having a rear end rotatably connected to the first hinge body and a front end rotatably connected to the second hinge body, a front connecting link 50 having a proximal end portion rotatably connected to a front end portion of the first hinge body and an intermediate portion rotatably connected to an intermediate portion of the moving link, and a supporting link having one end rotatably connected to a distal end of the front connecting link and the other end rotatably connected to the second hinge body. The front connecting link has a pair of resin spacers 57 interposed between the pair of side walls 11 of the first hinge body 10 and the pair of side walls 31 of the moving link.

6 Claims, 11 Drawing Sheets

(58) Field of Classification Search
USPC .......................................... 16/286, 287, 288
See application file for complete search history.

(56) References Cited

U.S. PATENT DOCUMENTS

| | | | | |
|---|---|---|---|---|
| 2003/0159249 | A1* | 8/2003 | Tsung-Lung | E05D 3/16<br>16/371 |
| 2011/0225768 | A1* | 9/2011 | Haemmerle | E05F 5/006<br>16/49 |
| 2013/0152339 | A1* | 6/2013 | Hung | E05F 5/02<br>16/50 |
| 2015/0330128 | A1* | 11/2015 | Ng | E05D 3/16<br>16/65 |
| 2017/0241175 | A1* | 8/2017 | Hammerer | E05D 3/16 |
| 2018/0106088 | A1* | 4/2018 | Zetti | E05F 5/10 |
| 2021/0230922 | A1* | 7/2021 | Salice | E05D 3/16 |
| 2022/0034578 | A1* | 2/2022 | Seo | F25D 23/028 |

FOREIGN PATENT DOCUMENTS

| | | | |
|---|---|---|---|
| JP | 6038968 | B2 | 12/2016 |
| JP | 2018-197437 | A | 12/2018 |
| WO | WO2010/075595 | A2 | 7/2010 |

OTHER PUBLICATIONS

WIPO, Japanese International Search Authority, International Search Report (with English translation) dated Jun. 9, 2020 in International Patent Application No. PCT/JP2020/016913, 3 pages.
WIPO, Japanese International Search Authority, International Written Opinion dated Jun. 9, 2020 in International Patent Application No. PCT/JP2020/016913, 3 pages.

* cited by examiner

HINGE HAVING DAMPER AND COIL SPRING

RELATED APPLICATIONS

This application is the U.S. National Phase of and claims priority to International Patent Application No. PCT/JP2020/016913, International Filing Date Apr. 17, 2020; which claims benefit of Japanese Patent Application No. 2019-092693 filed May 16, 2019; both of which are incorporated herein by reference in their entireties.

TECHNICAL FIELD

The present invention relates to a hinge device that rotatably connects two objects.

BACKGROUND

For example, a hinge device is used to rotatably attach a door (rotating object) to a housing (stationary object). A hinge device disclosed in Patent Document 1 (Japanese Patent No. 6038968) has a first hinge body attached to an inner surface of an opening side edge portion of a housing, a second hinge body fixed to a housing side surface of a side edge portion of a door and a link mechanism interposed between the first and second hinge bodies.

The above link mechanism will be briefly described. A moving link is movably connected to the first hinge body in a front-rear direction via a front and rear connecting links. That is, a proximal end of the rear connecting link is rotatably connected to a rear end of the first hinge body (an end farther from the second hinge body), and a proximal end of the front connecting link is rotatably connected to a front end of the first hinge body (an end closer to the second hinge body). A rear end of the moving link is rotatably connected to a distal end of the rear connecting link and an intermediate portion of the moving link is connected to an intermediate portion of the front connecting link so that the moving link moves in a front-rear direction as the front and rear connecting links rotate.

A front end of the moving link is rotatably connected to the second hinge body. One end of a supporting link is rotatably connected to a distal end of the front connecting link and the other end of the supporting link is rotatably connected to the second hinge body.

When the hinge device disclosed in Patent Document 1 is used, the door rotates from a closed state so as to cover an opening side end face of the housing while a side edge portion of the door on the hinge device side moves away from the housing. Therefore, the door can be opened at a relatively large opening angle without interfering with the housing.

Generally, the first and second hinge bodies and the four links are made of metal, and in order to prevent the metals of these constituent members from rubbing against each other, resin spacers are interposed between the constituent members that are rotatably connected to each other. These spacers are supported by shaft members that penetrate the constituent members. Patent Document 1 also shows a resin spacer interposed between the moving link and the front connecting link.

SUMMARY OF THE INVENTION

Problem to be Solved by the Invention

In the hinge device described above, the first hinge body has a pair of side walls, and the moving link has side walls of which a distance is wider than a distance between the pair of side walls of the first hinge body. Even when the moving link and the first hinge body overlap in the direction of the rotation axis, a gap is formed between the side wall of the first hinge body and the side wall of the moving link so that the metals do not rub against each other.

However, if the weight of the door to be supported becomes large, the constituent members of the hinge device are likely to be distorted and the door cannot be stably supported because there is a gap between the side wall of the first hinge body which is a main bearer of a load and the side wall of the moving link.

Means for Solving the Problem

In order to solve the above problem, the present invention is a hinge device including a first hinge body having a pair of side walls, a second hinge body provided on a front side of the first hinge body and a link mechanism interposed between the first hinge body and the second hinge body, wherein the link mechanism including a moving link supported by the first hinge body so as to be movable in a front-rear direction, the moving link having a pair of side walls and a front end portion rotatably connected to the second hinge body, a front connecting link having a proximal end portion rotatably connected to a front end portion of the first hinge body and an intermediate portion rotatably connected to an intermediate portion of the moving link, and a supporting link having one end rotatably connected to a distal end of the front connecting link and the other end rotatably connected to the second hinge body, wherein the hinge device is configured such that the pair of side walls of the moving link overlap an outside of the pair of side walls of the first hinge body, and wherein the front connecting link has a main part connected to the first hinge body, the moving link and the supporting link and a pair of spacers made of resin interposed between the pair of side walls of the first hinge body and the pair of side walls of the moving link.

According to the above configuration, since the resin spacers are interposed between the side wall of the first hinge body which is a main bearer of a load but are not in a direct rotational connection relationship and the side wall of the moving link, the first hinge body attached to a stationary object can receive the load of a rotating object via the second hinge body and the moving link, and further via the spacer so that it is possible to suppress distortion of the constituent members of the hinge device due to a gap between the side wall of the first hinge body and the side wall of the moving link. As a result, the rotating object can be stably supported even if the weight of the rotating object is large.

Further, since the spacer is made of resin, even if the first hinge body and the moving link are made of metal, it is possible to avoid rubbing between the metals.

It is preferred that the main part of the front connecting link has a proximal end side connecting portion that enters between the pair of side walls of the first hinge body and is rotatably connected to the front end portion of the first hinge body and an intermediate connecting portion that enters between the pair of side walls of the moving link and is rotatably connected to the intermediate portion of the moving link, and at least both sides of the proximal end side connecting portion and the intermediate connecting portion are made of resin.

According to the above configuration, the first hinge body can firmly receive the load from the moving link while avoiding the rubbing between the metals even through the main part of the front connecting link so that the rotating object can be supported more stably.

It is preferred that both side surfaces of the intermediate connecting portion and outer surfaces of the pair of spacers are flush with each other.

According to the above configuration, since the front connecting link supports the moving link over a wide area, it is possible to support the rotating target more stably.

It is preferred that the pair of spacers extends between the intermediate connecting portion of the main part and the proximal end side connecting portion, a pair of slits are formed between both side surfaces of the main part and an inner surface of the pair of spacers and the pair of side walls of the first hinge body enters the pair of slits.

According to the above configuration, the side wall of the first hinge body, the side wall of the moving link, the main part of the front connecting link and the spacer overlap each other so that the load can be borne even more firmly.

It is preferred that the main part of the front connecting link has a distal end side connecting portion that enters between a pair of side walls of the supporting link and is rotatably connected to the one end of the supporting link, and at least both sides of the distal end side connecting portion are made of resin.

According to the above configuration, the first hinge body can firmly bear the load while avoiding rubbing between the metals even through the main part of the front connecting link from the supporting link. Further, even if the supporting link is made of metal, the metal does not rub against each other between the front connecting link and the supporting link.

It is preferred that the entire front connecting link is made of resin and the main part and the pair of spacers are integrated.

According to the above configuration, the front connecting link can be easily manufactured.

It is preferred that the front connecting link includes a pair of halved members that are assembled together, an storage hole is formed between the pair of halved members, a linear damper is stored in the storage hole and a contact member provided at a distal end of the linear damper is in contact with the front end portion of the first hinge body.

According to the above configuration, the storage hole for storing the linear damper can be easily formed.

The hinge device further includes a rear connecting link made of resin and the rear connecting link integrally includes a proximal end side connecting portion that enters between the pair of side walls of the first hinge body and is rotatably connected to a rear end portion of the first hinge body, a distal end side connecting portion that enters between the pair of side walls of the moving link and is rotatably connected to a rear end of the moving link, and a pair of spacers interposed between the pair of side walls of the first hinge body and the pair of side walls of the moving link.

According to the above configuration, the load can be borne by the spacer of the rear connecting link being interposed between the first hinge body and the moving link so that the rotating object can be supported more stably.

Effect of the Invention

According to the present invention, the rotating object can be stably supported even when the weight of the rotating object is large.

MODE FOR CARRYING OUT THE INVENTION

Figure 1A:
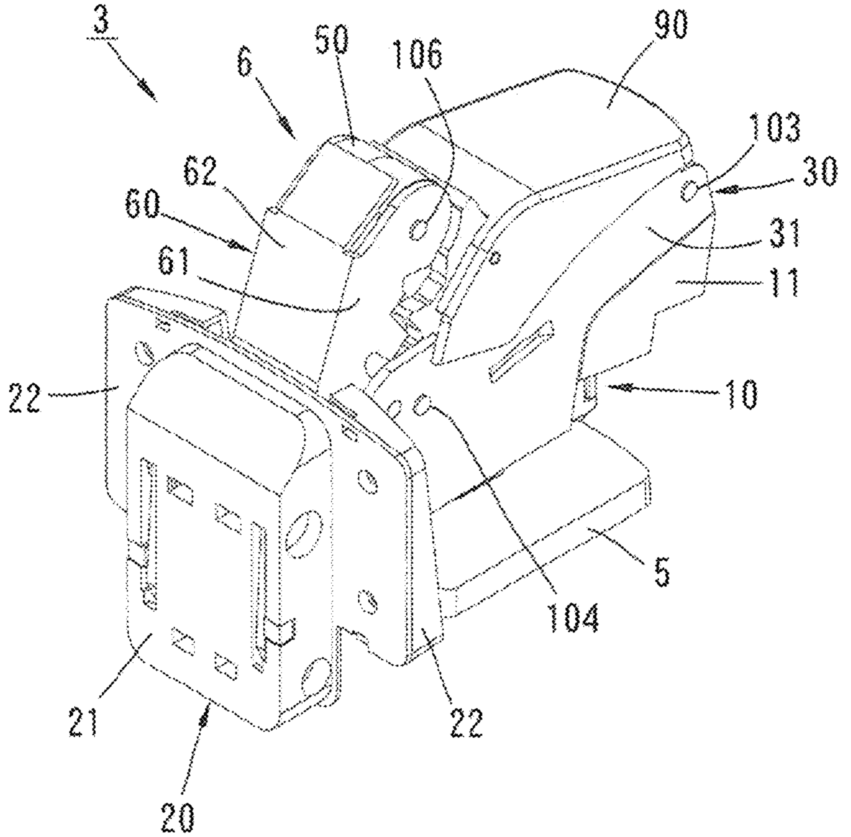
FIG. 1A is a perspective view showing a hinge device according to an embodiment of the present invention in a closed state.
Figure 1B:
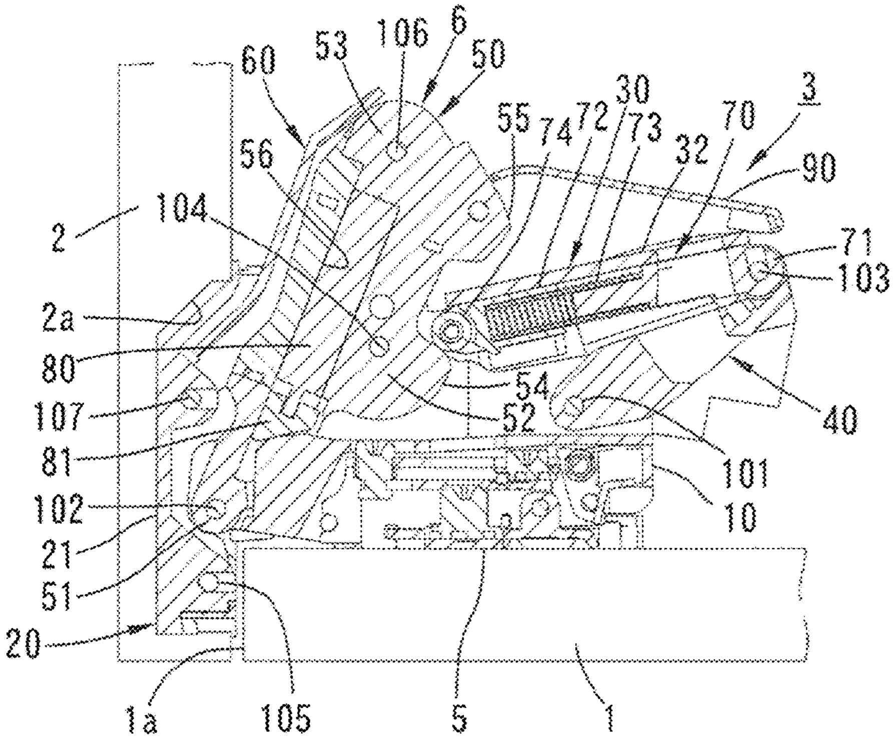
FIG. 1B is a plan cross-sectional view showing the hinge device in the closed state.

Hereinafter, an embodiment of the present invention will be described with reference to the drawings. As shown in FIG. 1B, a hinge device 3 rotatably connects one side edge (right edge) of a door 2 (rotating object) to one side edge (in this embodiment, a side edge located on a right side when a housing 1 is viewed from an opening side thereof) of the opening of the housing 1 (stationary object) and are installed at two locations (plural locations) separated in the vertical direction (direction orthogonal to the paper surface in FIG. 1B). Hereinafter, the opening side of the housing 1 will be referred to as a front side, and a back side of the housing 1 will be referred to as a rear side.

Figure 3A:
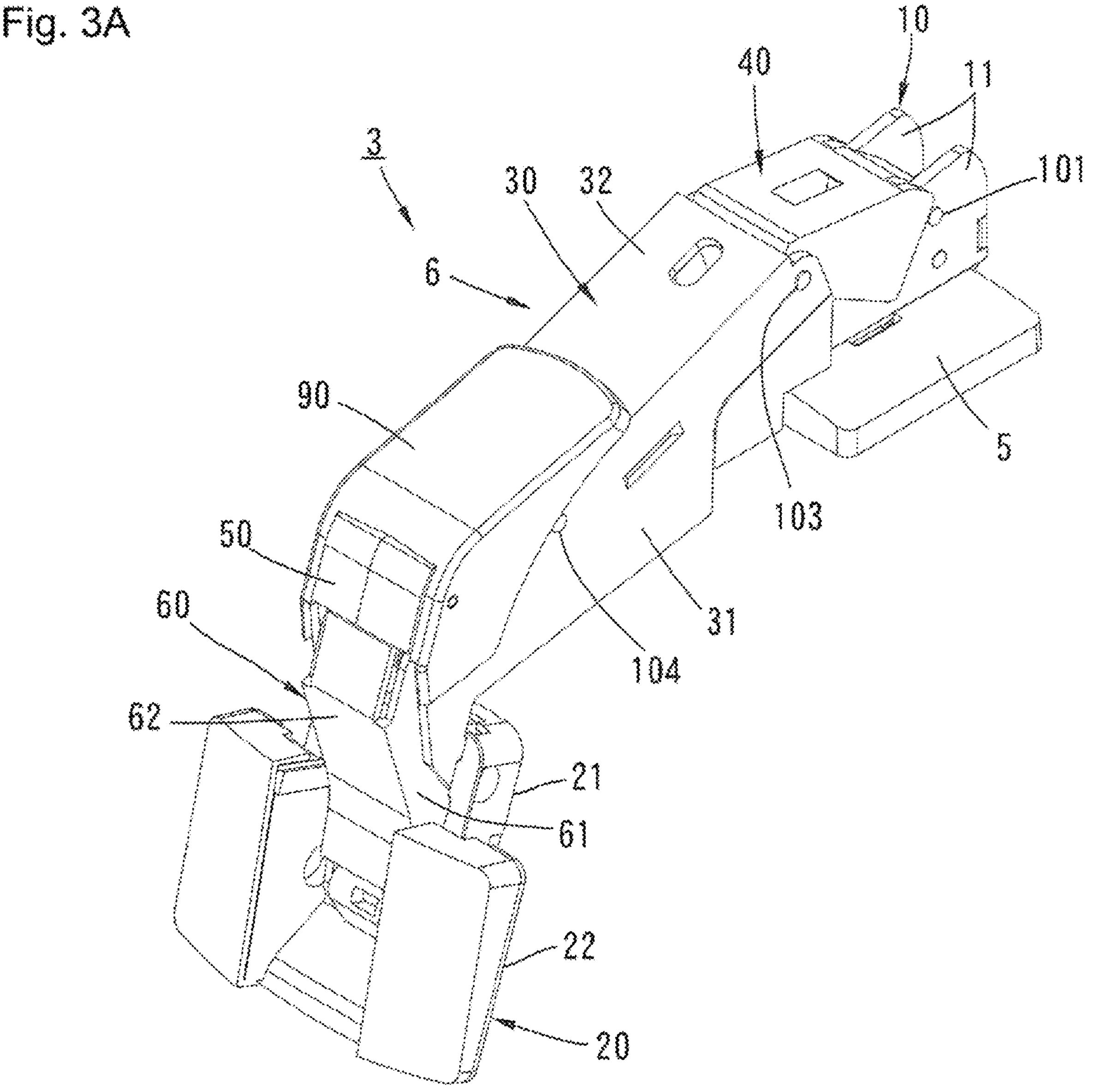
FIG. 3A is a perspective view showing the hinge device in a state of being opened by 160 degrees.
Figure 3B:
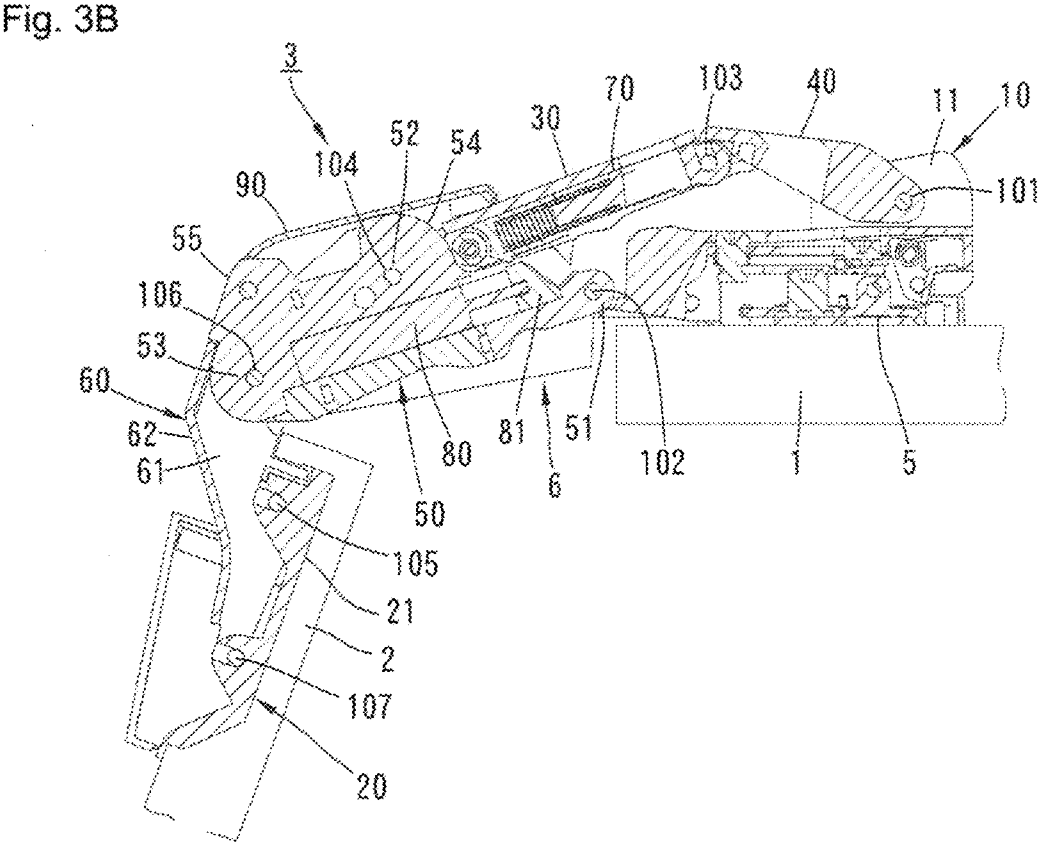
FIG. 3B is a plan cross-sectional view showing the hinge device in a state of being opened by 160 degrees.

The door 2 can be opened up to 160 degrees as shown in FIG. 3B from a state in which the opening of the housing 1 is closed as shown in FIG. 1B via a state in which the door 2 is opened by 90 degrees.

As shown in FIGS. 1 to 5, the hinge device 3 includes a washer 5, a first hinge body 10, a second hinge body 20, and a link mechanism 6 interposed between the first and second hinge bodies 10, 20.

The washer 5 is fixed to an inner surface of a side wall of the housing 1 with screws. The first hinge body 10 is detachably attached to the washer 5. Since this attaching structure is known, detailed description thereof will be omitted. The washer 5 and the first hinge body 10 are made of metal.

The first hinge main body 10 extends in a front-rear direction and has a pair of side walls 11 that are parallel to each other and face each other in the vertical direction.

The second hinge body 20 is made of hard resin and has a socket portion 21 and a pair of flange portions 22 protruding in the vertical direction from the socket portion 21. As shown in FIG. 1B, a recess 2*a* is formed on a surface of the right edge of the door 2 on a side of the housing 1, the socket portion 21 is fitted into the recess 2*a*, and the flange portions 22 are fixed to the door 2 with screws, so that the second hinge body 20 is attached to the door 2.

The link mechanism 6 includes a moving link 30 made of metal, a rear connecting link 40 made of hard resin, a front connecting link 50 made of hard resin and a supporting link 60 made of metal.

The moving link 30 is formed into an elongated shape in a longitudinal direction of the first hinge body 10, and has a pair of side walls 31 that are parallel to each other and face each other in the vertical direction and a connecting wall 32 that connects rear portions of the side walls 31 to be formed to have a substantially U-shaped cross section. The supporting link 60 also has a pair of side walls 61 that are parallel to each other and face each other vertically and a connecting wall 62 that connects the side walls 61 to be formed to have a substantially U-shaped cross section.

The moving link 30 is movably connected to the first hinge body 10 in the front-rear direction via the rear connecting link 40 and the front connecting link 50. Briefly, a proximal end portion of the rear connecting link 40 is rotatably connected to a rear end portions of the pair of side walls 11 of the first hinge body 10 by a first shaft member 101. The proximal end portion of the front connecting link 50 is rotatably connected to a front end portions of the pair of side walls 11 of the first hinge body 10 by a second shaft member 102.

A rear end portion of the moving link 30 is rotatably connected to a distal end of the rear connecting link 40 by a third shaft member 103 and an intermediate portion of the moving link 30 is rotatably connected to an intermediate portion of the front connecting link 50 by a fourth shaft member 104. With this configuration, the moving link 30 can move in the front-rear direction (longitudinal direction of the first hinge body 10 and the moving link 30) as the rear connecting link 40 and the front connecting link 50 rotate.

A front end portion of the side wall 31 of the moving link 30 enters the socket portion 21 of the second hinge body 20 and is rotatably connected to the socket portion 21 by a fifth shaft member 105.

One end of the side wall 61 of the supporting link 60 is rotatably connected to a distal end of the front connecting link 50 by a sixth shaft member 106. The other end of the side wall 61 of the supporting link 60 enters the socket portion 21 of the second hinge body 20 and is rotatably connected to the socket portion 21 by a seventh shaft member 107.

The shaft members 101 to 107 extend in the vertical direction and are parallel to each other. The fifth shaft member 105 and the seventh shaft member 107 are separated from each other at the socket portion 21 of the second hinge body 20.

The moving link 30 is wider than the first hinge body 10, the front and rear connecting links 40 and 50 and the supporting link 60, and these components can be stored between the pair of side walls 31.

Since a distance between inner surfaces of the pair of side walls 31 of the moving link 30 is wider than a distance between outer surfaces of the pair of side walls 11 of the first hinge body 10 and a distance between outer surfaces of the pair of side walls 61 of the supporting link 60, the side wall 31 and the side walls 11 and 61 are separated from each other, so that the metals do not rub directly against each other even when the side wall 31 of the moving link 30 and the side wall 11 of the first hinge body 10 and the side wall 61 of the supporting link 60 overlap in the direction of the rotation axis.

Figure 6A:
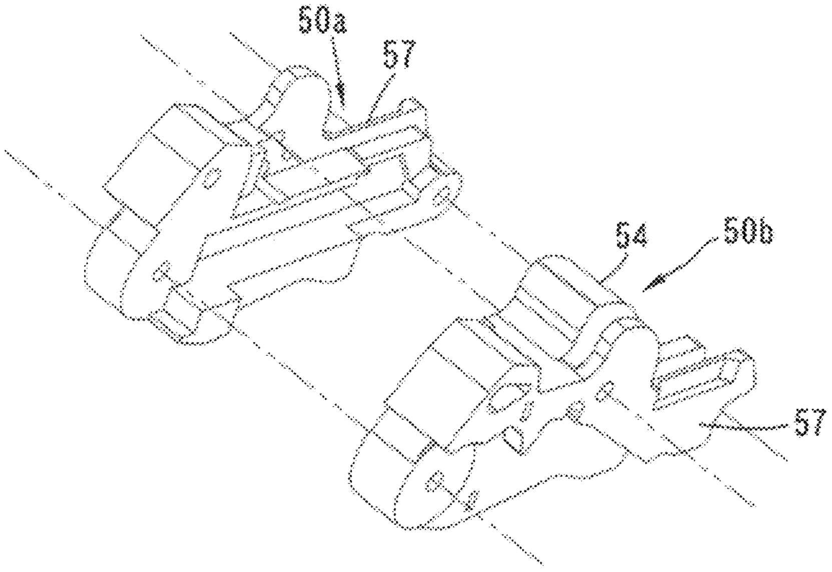
FIG. 6A is an exploded perspective view of a front connecting link of the hinge device.
Figure 6B:
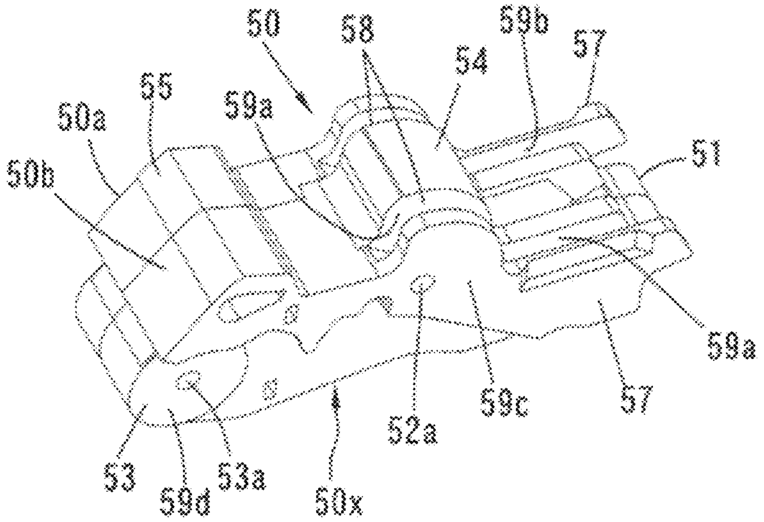
FIG. 6B is a perspective view showing the front connecting link in an assembled state.
Figure 6C:
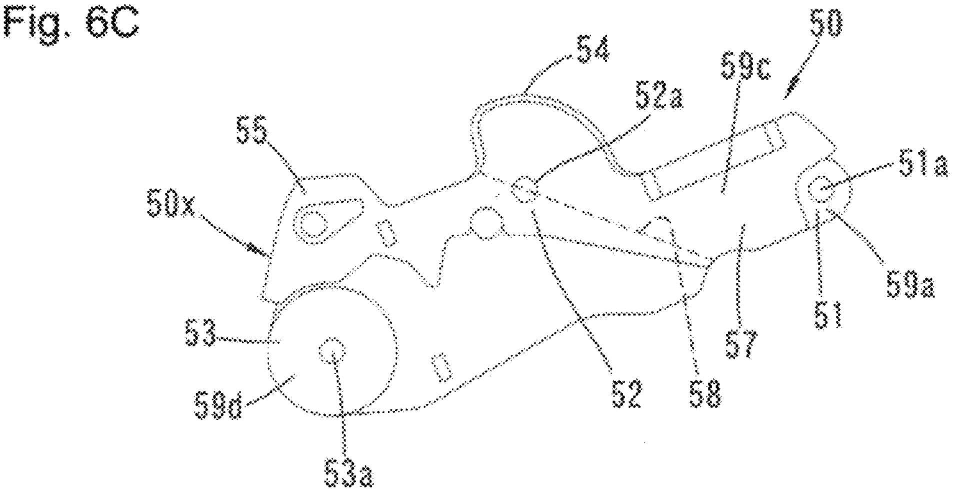
FIG. 6C is a plan view of the front connecting link.
Figure 6D:
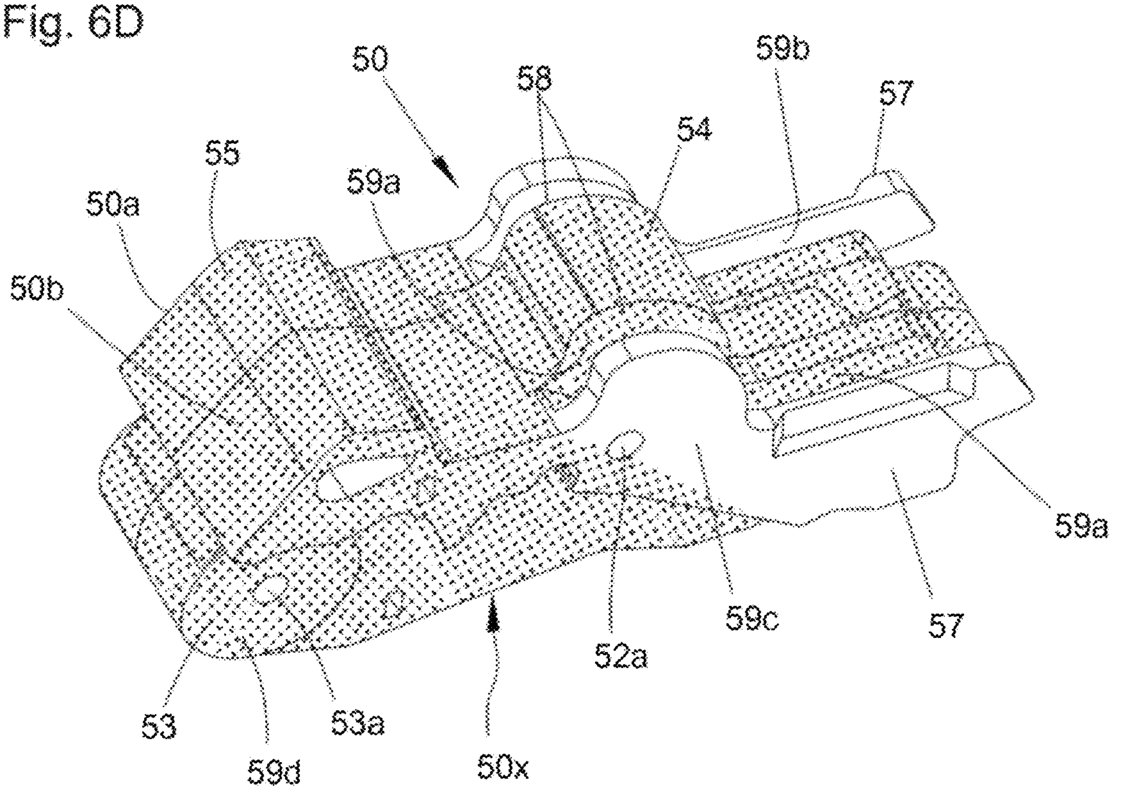
FIG. 6D is a perspective view showing the front connecting link in an assembled state, with main part 50*x* shown as shaded.
Figure 6E:
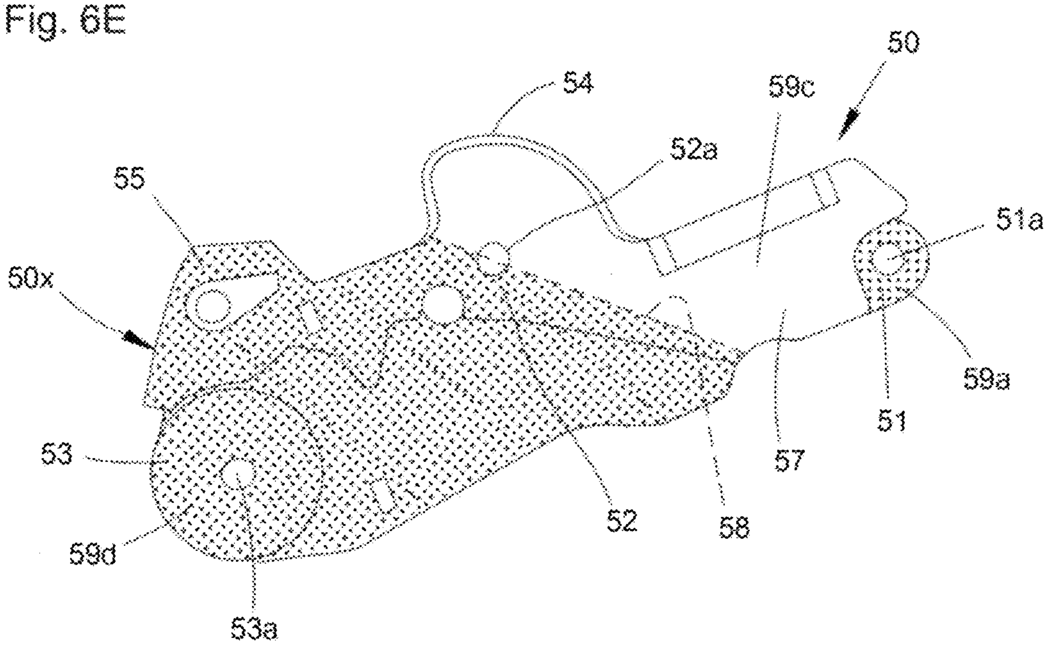
FIG. 6E is a plan view of the front connecting link, with main part 50*x* shown as shaded.

Next, the configuration of the front connecting link 50 made of resin will be described in detail. As shown in FIG. 6A, the front connecting link 50 is configured by assembling two halved members 50*a* and 50*b* made of the resin. As shown in FIGS. 6B and 6C, a main part 50*x* of the front connecting link 50 includes a proximal end side connecting portion 51 rotatably connected to a front end portion of the first hinge body 10, an intermediate connecting portion 52 rotatably connected to an intermediate portion of the moving link 30, a distal end side connecting portion 53 rotatably connected to one end of the supporting link 60, a cam portion 54 and a cover attaching portion 55. Further, the main part 50*x* has a linearly extending storage hole 56 (see, FIG. 1B) formed between the two halved members 50*a* and 50*b*.

Through holes 51*a*, 52*a* and 53*a* are formed in each connecting portion 51, 52 and 53 for passing the second shaft member 102, the fourth shaft member 104 and the sixth shaft member 106, respectively.

The front connecting link 50 further has a pair of thin plate-shaped spacers 57 formed integrally with the main part 50*x* on both sides of the main part 50*x*. These spacers 57 are arranged so as to extend between the distal end side connecting portion 51 and the intermediate connecting portion 52 of the main part 50*x* and reach the cam portion 54. A slit 58 is formed between the pair of spacers 57 and both side surfaces of a portion of the main part 50*x* facing the spacer 57.

Figure 4:
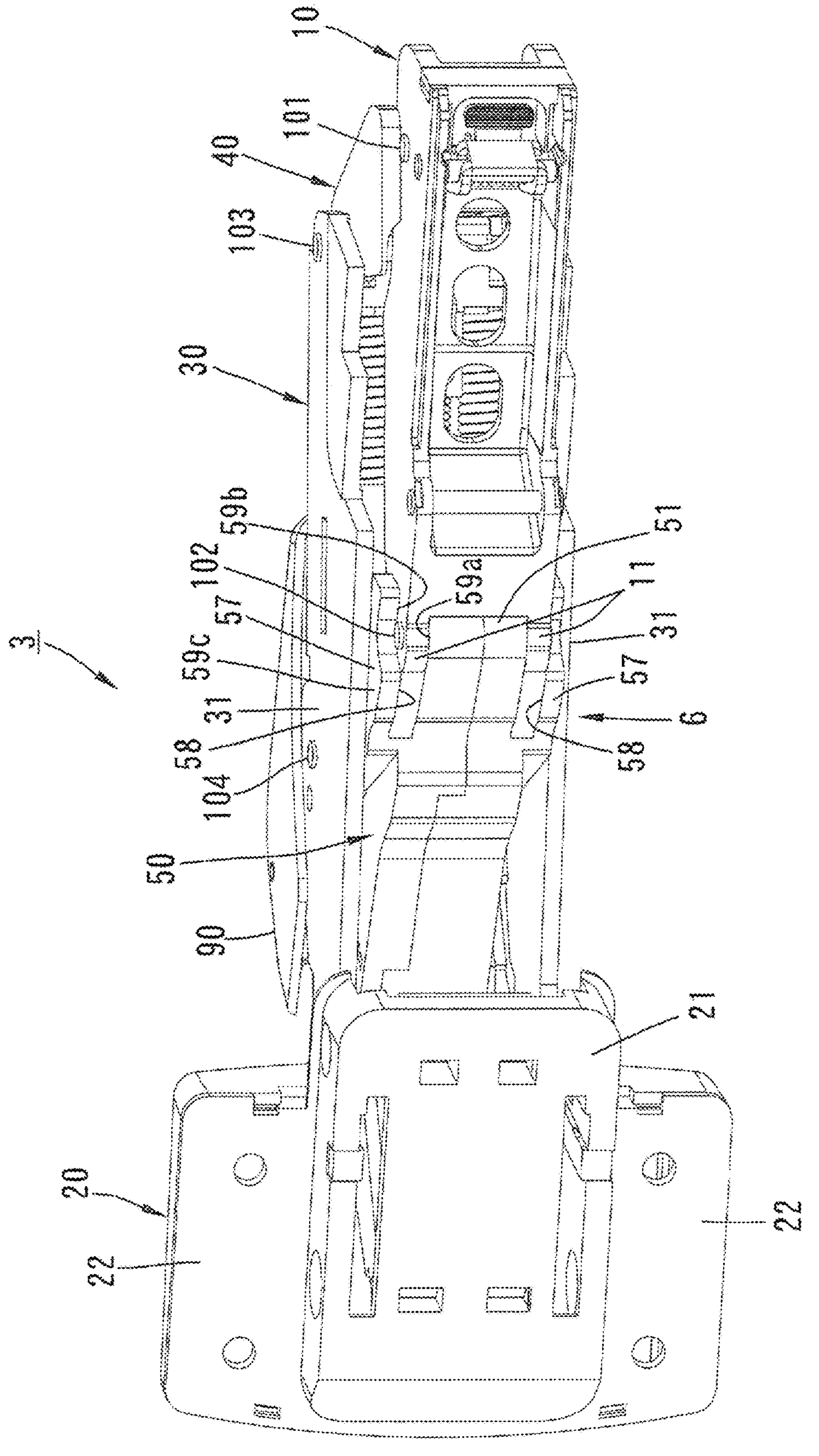
FIG. 4 is a perspective view of the hinge device in a state of being opened by 90 degrees as viewed from a back side.

As shown in FIG. 4, the side wall 11 of the first hinge body 10 is inserted into the slit 58 of the front connecting link 50 without a gap. In the main part 50*x* of the front connecting link 50, both side surfaces of a portion including the proximal end side connecting portion 51 and the cam portion 54 are provided as continuous flush surfaces 59*a* in contact with an inner surface of the side wall 11. An inner surface of the spacer 57 is provided as a sliding surface 59*b* in contact with an outer surface of the side wall 11.

A portion including the pair of spacers 57 of the front connecting link 50, the intermediate connecting portion 52 of the main part 50*x* and the cover attaching portion 55 is inserted between the pair of side walls 31 of the moving link 30 without a gap and an outer surfaces of the pair of spacers 57 and both side surfaces of the main part 51*x* are provided as continuous flush surfaces 59*c* in contact with an inner surface of the side wall 31.

As shown in FIG. 6, the distal end side connecting portion 53 is inserted between the pair of side walls 61 of the supporting link 60 without a gap and both side surfaces thereof are provided as sliding surfaces 59*d* in contact with the side wall 61.

Since the distance between the pair of side walls 31 of the moving link 30 is wider than the distance between the pair of side walls 11 of the first hinge body 10 and the pair of side walls 61 of the supporting link 60, the sliding surface 59*c* projects outward in the width direction from the sliding surfaces 59*a* and 59*d*.

Figure 7A:
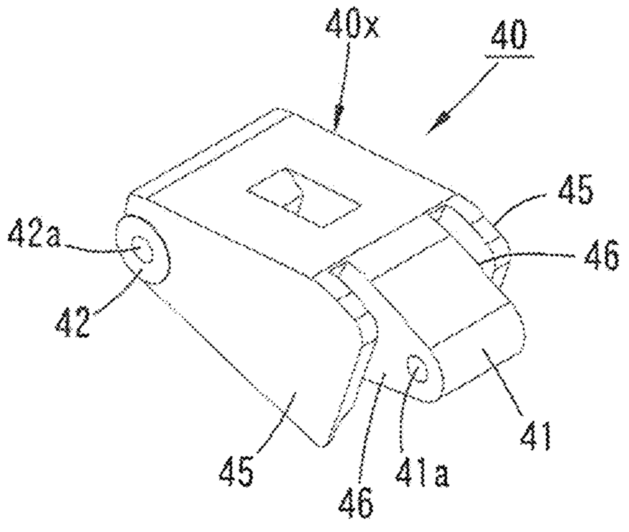
FIG. 7A is a perspective view of a rear connecting link of the hinge device.
Figure 7B:
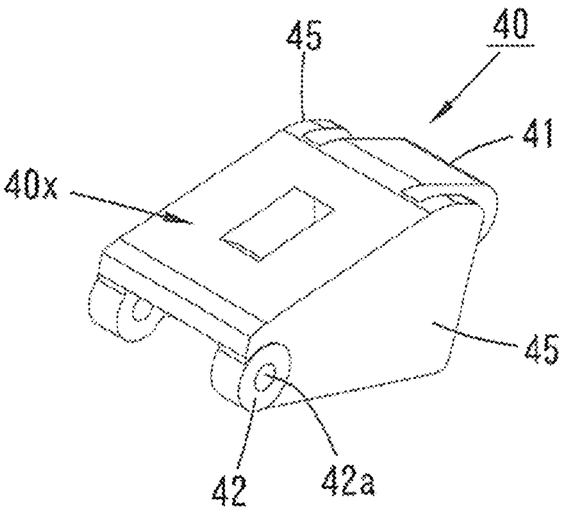
FIG. 7B is a perspective view of the rear connecting link as viewed from one different direction.
Figure 7C:
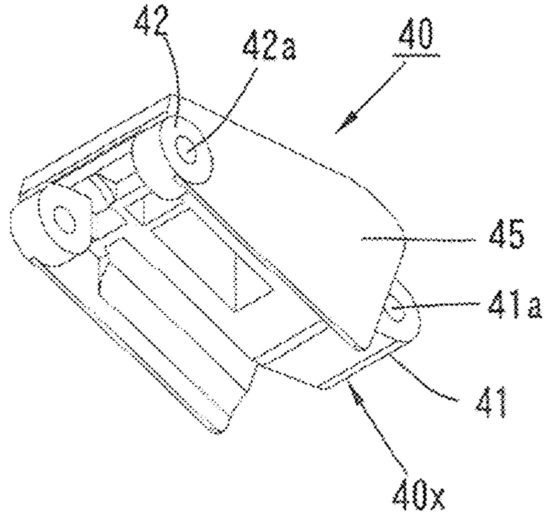
FIG. 7C is a perspective view of the rear connecting link as viewed from another different direction.

Next, the rear connecting link 40 made of resin will be described in detail with reference to FIG. 7. The rear connecting link 40 integrally has a main part 40*x* and a pair of spacers 45 arranged on both sides of the main part 40*x*.

The main part 40*x* of the rear connecting link 40 has a proximal end side connecting portion 41 and a distal end side connecting portion 42. Through holes 41*a* and 42*a* for passing the first shaft member 101 and the third shaft member 103 are formed in the connecting portions 41 and 42. The proximal end side connecting portion 41 is inserted between the pair of side walls 11 of the first hinge body 10 without a gap and is rotatably connected to a rear end portion of the first hinge body 10, and the distal end side connecting portion 42 is inserted between the pair of side walls 31 of the moving link 30 without a gap and is rotatably connected to a rear end portion of the moving link 30.

The side wall 11 of the first hinge body 10 is inserted into a slit 46 formed between the main part 40*x* and a spacer 45 without a gap and the spacer 45 is inserted between the side wall 11 of the first hinge body 10 and the side wall 31 of the moving link 30 without a gap.

Figure 5:
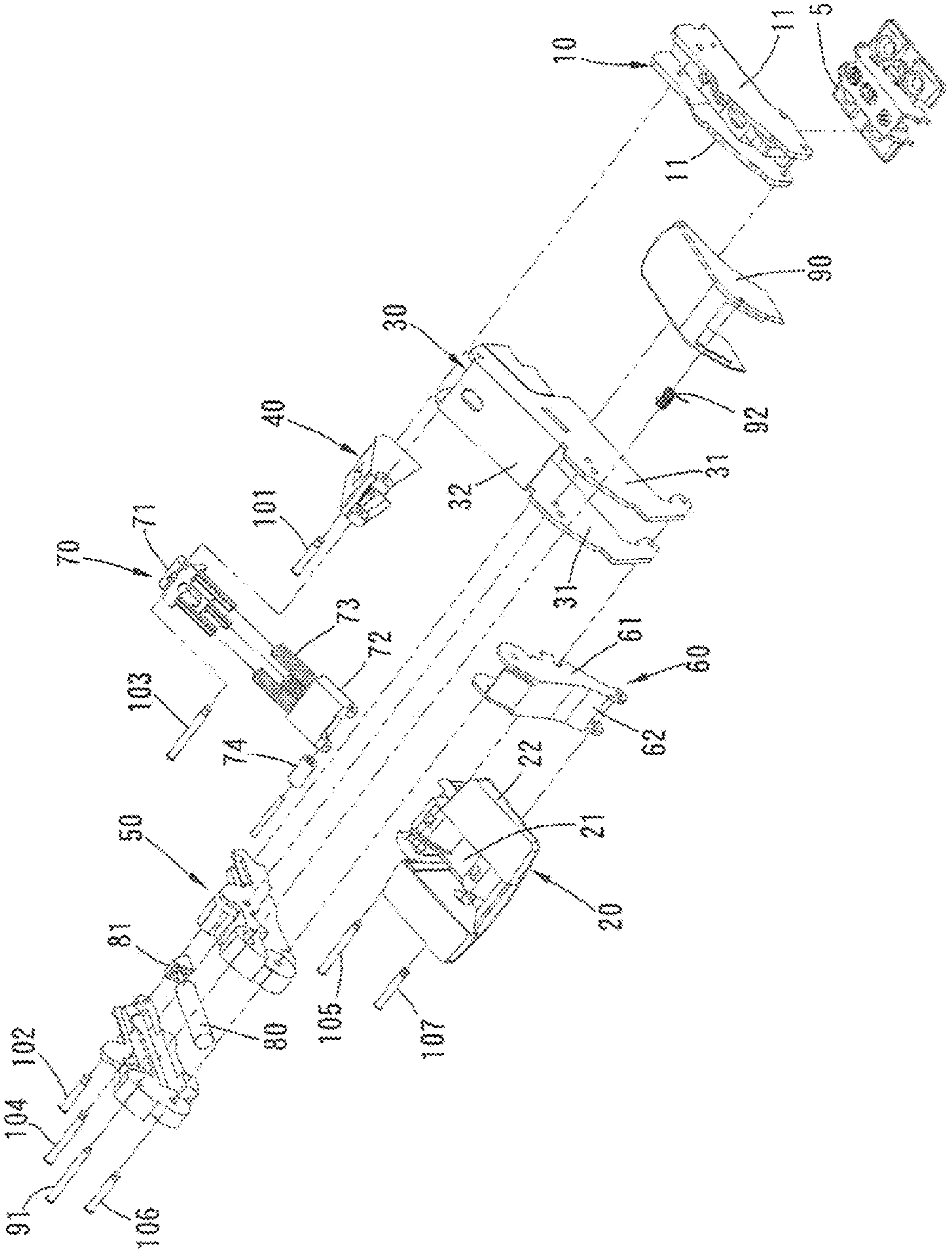
FIG. 5 is an exploded perspective view of the hinge device.

Next, the configuration associated with the hinge device 3 will be briefly described. As shown in FIGS. 1B and 5, the hinge device 3 includes an energizing mechanism 70. The energizing mechanism 70 has a spring holder 71 supported by the shaft member 103 that connects the rear connecting link 40 and the moving link 30, a slider 72 that can slide along the connecting wall 32 of the moving link 30, a compression coil spring 73 arranged between the spring holder 71 and the slider 72 and a pressing roller 74 provided at a distal end of the slider 72. The pressing roller 74 is pressed against a peripheral surface of the cam portion 54 of the front connecting link 50 by the force of the compression coil spring 73 and the door 2 is energized in a closing direction in a state of less than a predetermined opening angle by the cam action of the cam portion 54.

A linear damper 80 is stored in the storage hole 56 of the front connecting link 50. A contact member 81 is provided at a distal end of a rod of the linear damper 80 and the contact member 81 is in contact with a front end portion of the first hinge body 10. The linear damper 80 cushions a impact when the door 2 is closed.

A cover 90 is attached to the front connecting link 50 by a pin 91. The cover 90 is energized toward the front connecting link 50 by a spring 92 wound around the pin 91. The cover 90 can cover the cam portion 54 when the door 2 is in the open state.

Figure 1C:
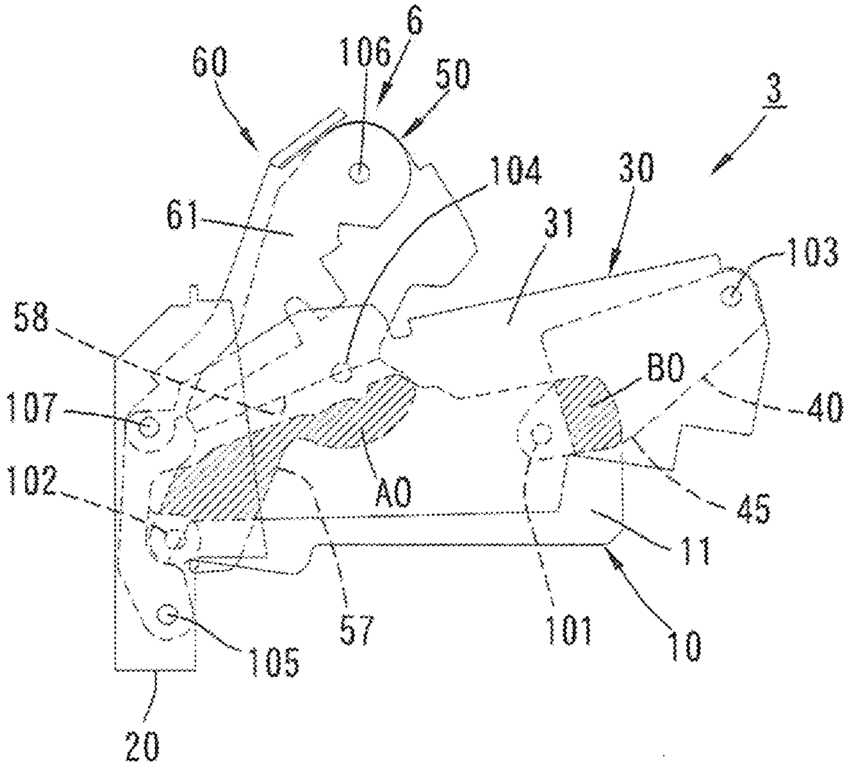
FIG. 1C is a plan view showing main components of the hinge device in a closed state.

An operation of the hinge device 3 having the above configuration will be described. As shown in FIGS. 1A to 1C, when the door 2 closes the opening of the housing 1, the second hinge body 20 is located at a position close to the first hinge body 10 at a substantially right angle to the first hinge body 10 and the door 2 covers an end surface 1*a* on the opening side of the housing 1.

As shown in FIG. 1C, in the closed state of the door 2, the pair of side walls 31 of the moving link 30 overlap the pair of side walls 11 of the first hinge body 10 over a wide range and the pair of spacers 57 of the front connecting link 50 are interposed between the side wall 11 of the hinge body 10 and the side wall 31 of the moving link 30 over a relatively wide area A0 (shown by hatching) in this overlapping region. As a result, the load of the door 2 is received by the first hinge body 10 from the moving link 30 via the spacer 57. In particular, in this embodiment, the load is transmitted in a state where the main portion 50*x* of the front connecting link 50, the side wall 11 of the first hinge body 10, the spacer 57 and the side wall 31 of the moving link 30 are overlapped, so that the load can be received even more effectively.

Further, in a region other than the region A0, the load is transmitted from the side wall 31 of the moving link 30 to the main part 50*x* of the front connecting link 50 via the sliding surface 59*c*, and is transmitted from the side wall 61 of the supporting link 60 to the main part 50*x* via the sliding surface 59*d*, and is further transmitted from the main part 50*x* to the side wall 11 of the first hinge body 10 via the sliding surface 59*a*, so that the load of the door 2 can be received even through this path.

Further, also in the rear connecting link 40, the pair of spacers 45 are interposed between the side wall 11 of the hinge body 10 and the side wall 31 of the moving link 30 in the region BO (shown by hatching), so that the load of the door 2 can be received.

Since the load of the door 2 is received as described above, the door 2 can be stably supported without distorting the constituent members of the hinge device 2 even if the weight of the door 2 is large.

When the door 2 is opened against the energizing force in the closing direction, as the moving link 30 moves forward due to the rotation of the front and rear connecting links 40 and 50, the door 2 is rotated in the opening direction while the side edge portion of the door 2 moves away from the housing 1. In the rotation range in which the door 2 reaches an opening angle of 90 degrees, the spacer 57 is temporarily disengaged from the overlapping region of the side wall 11 of the first hinge body 10 and the side wall 31 of the moving link 30 in a partial angle range, but similar to the closed state described above, the load of the door 2 is received by the first hinge body 10 from the moving link 30 and the supporting link 60 via the main part 50*x* of the front connecting link 50. The same applies to the rear connecting link 40.

Figure 2A:
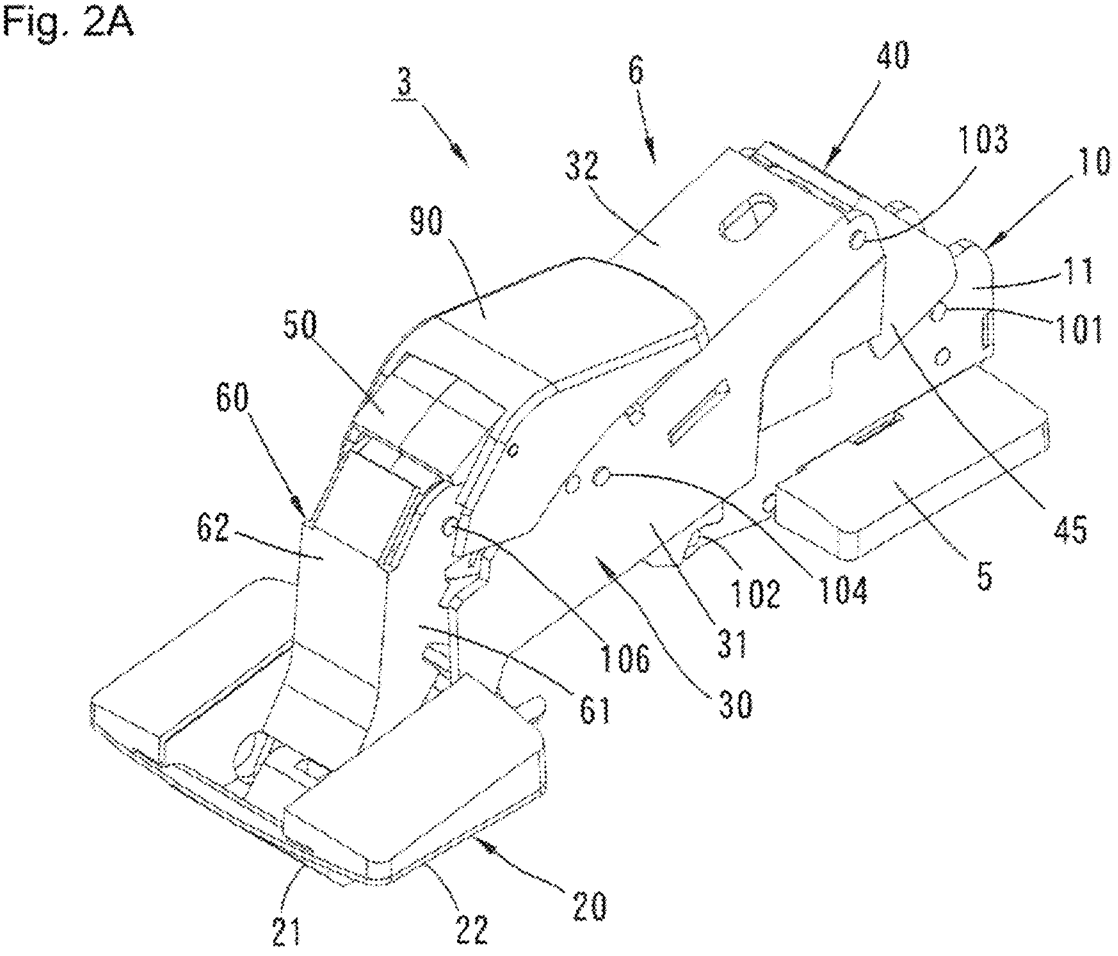
FIG. 2A is a perspective view showing the hinge device in a state of being opened by 90 degrees.
Figure 2B:
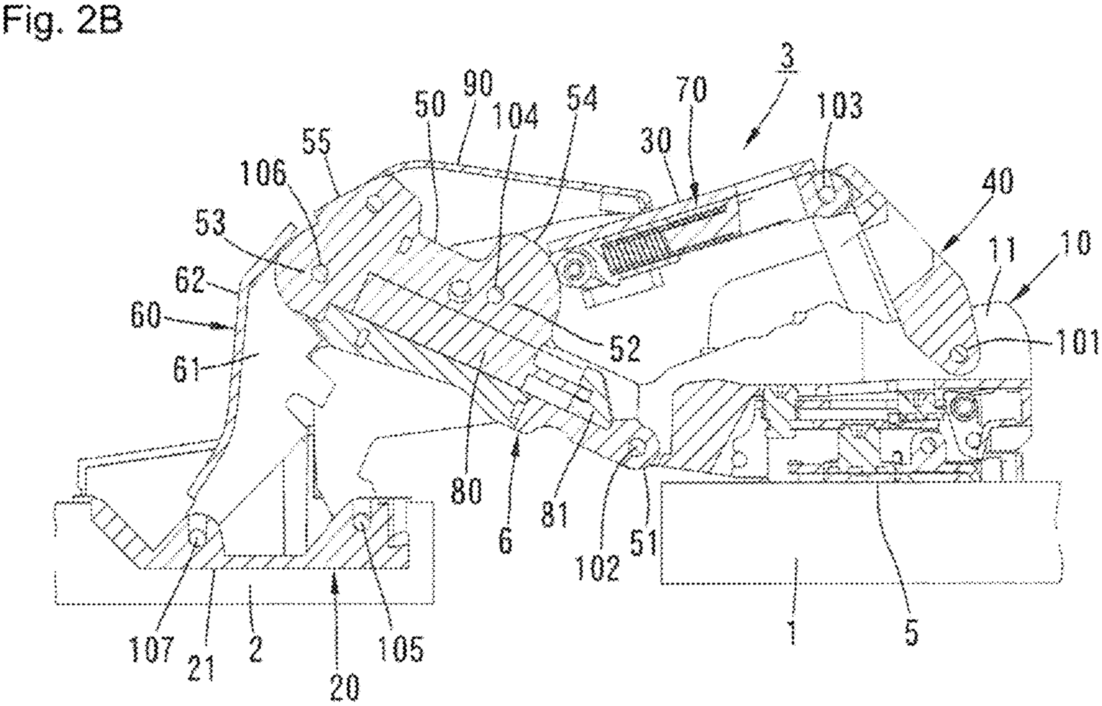
FIG. 2B is a plan cross-sectional view showing the hinge device in a state of being opened by 90 degrees.
Figure 2C:
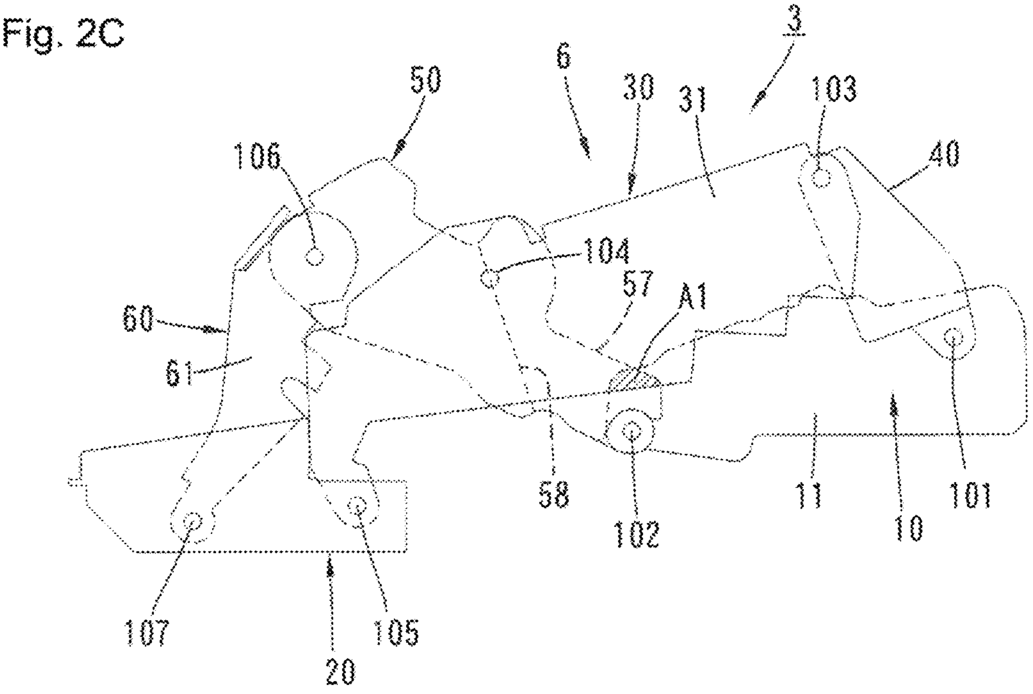
FIG. 2C is a plan view showing the main components of the hinge device in a state of being opened by 90 degrees.

As shown in FIGS. 2A to 2C, when the door 2 is in an intermediate opening position, for example, the opening position of 90 degrees, an overlapping region between the pair of side walls 31 of the moving link 30 and the pair of side walls 11 of the first hinge body 10 becomes narrower, but the pair of spacers 57 of the front connecting link 50 are interposed between the side wall 11 of the first hinge body 10 and the side wall 31 of the moving link 30 in a partial area A1 (indicated by hatching) of this overlapping region. Further, the sliding surface 59*c* is in contact with the inner surface of the side wall 31 of the moving link 30 in a wide range, and the sliding surface 59*d* is in contact with the inner surface of the side wall 61 of the supporting link 60, and the sliding surface 59*a* of the main part 50*x* is in contact with the inner surface of the side wall 11 of the first hinge body 10, so that the load transmission via the main part 50*x* is also maintained. In the rear connecting link 40, the load is transmitted only through the main part 40*x*.

Figure 3C:
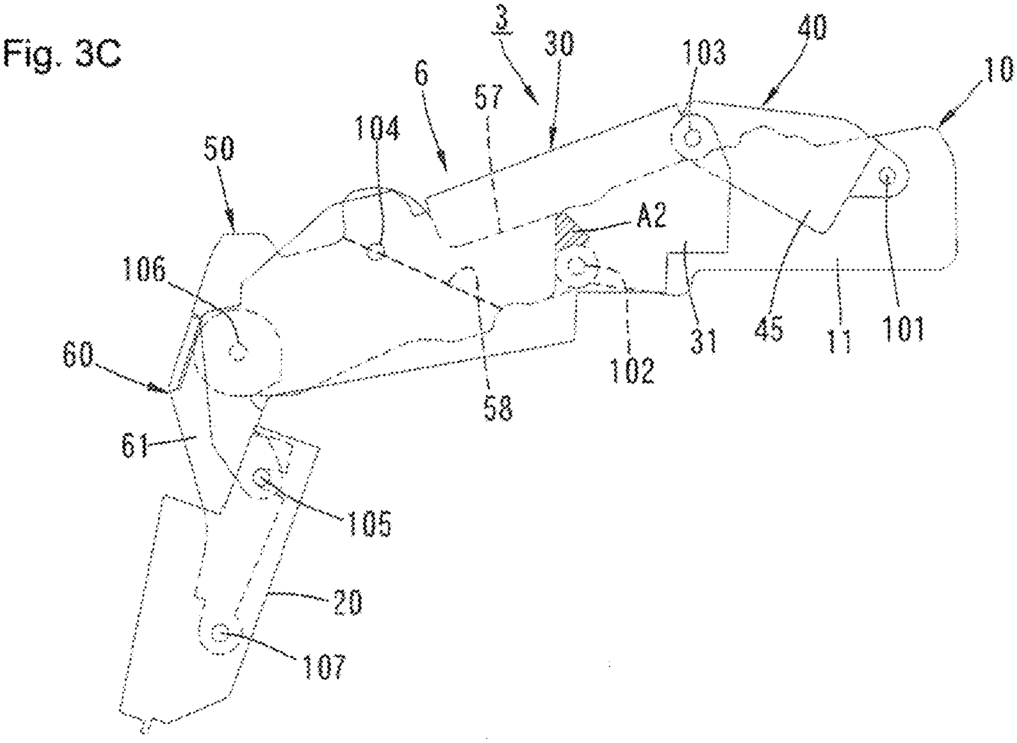
FIG. 3C is a plan view showing the main components of the hinge device in a state of being opened by 160 degrees.

As shown in FIGS. 3A to 3C, the door 2 can be further opened up to a set angle (160 degrees in this embodiment). In a partial area A2 (indicated by hatching) in the overlapping region of the pair of side walls 31 of the moving link 30 and the pair of side walls 11 of the first hinge body 10, the pair of spacers 57 of the front connecting link 50 are interposed between the side wall 11 of the first hinge body 10 and the side wall 31 of the moving link 30. Further, the sliding surface 59*c* of the main part 50*x* is in contact with the inner surface of the side wall 31 of the moving link 30 in a wide area, and the sliding surface 59*d* is in contact with the side wall 61 of the supporting link 60, and the sliding surface 59*a* of the main part 50*x* is in contact with the inner surface of the side wall 11 of the first hinge main body 10, so that the load transmission via the main part 50$x$ is also maintained. In the rear connecting link 40, the load is transmitted only through the main part 40$x$.

As described above, since the load of the door 2 in the open position can be received, the door 2 can be stably supported and opened/closed. When opening and closing the door 2, since the front and rear connecting links 40 and 50 are made of resin, it is possible to avoid rubbing between the metals.

It should be noted that the present invention is not limited to the above-described embodiment, and various modifications can be made without departing from the spirit of the present invention.

The side wall of the first hinge body and the side wall of the moving link may overlap in the entire rotation range from the closed position of the door to the fully open position, or may overlap in a partial angle range.

The spacer of the front connecting link may be interposed between the side wall of the first hinge body and the side wall of the moving link over the entire angle range where the side wall of the first hinge body and the side wall of the moving link overlap, or the spacer may be interposed only in a part of the above angle range.

The front connecting link may be composed of a single resin molded product instead of assembling the two halved members.

The spacer may be separated from the main part of the front connecting link and fixed to this main part.

The front connecting link may be made of metal in the middle and resin on both sides thereof.

In the above embodiment, the rear end portion of the moving link 30 is connected to the first hinge body 10 via the rear connecting link 40 so as to be movable in the front-rear direction. Instead of using the rear connecting link 40, by providing a slide pin at the rear end of the moving link and slidably inserting the slide pin into the slit formed in the first hinge body, the rear end of the movement link may be connected to the first hinge body so as to be movable in the front-rear direction.

The stationary object may be a door frame instead of the housing.

INDUSTRIAL APPLICABILITY

The present invention is applicable to a hinge device used for opening and closing a door and the like.

What is claimed is:

1. A hinge device comprising:
- a first hinge body (10) having a pair of side walls (11),
- a second hinge body (20) provided on a front side of the first hinge body (10) and
- a link mechanism (30) interposed between the first hinge body (10) and the second hinge body (20),
  - the link mechanism (30) comprising:
    - a moving link (30) supported by the first hinge body (10) so as to be movable in a front-rear direction, the moving link (30) having a pair of side walls (31) and a front end portion rotatably connected to the second hinge body (20),
    - a front connecting link (50) having a proximal end portion rotatably connected to a front end portion of the first hinge body (10) and an intermediate portion rotatably connected to an intermediate portion of the moving link (30), and
    - a supporting link (60) having one end rotatably connected to a distal end of the front connecting link (50) and the other end rotatably connected to the second hinge body (20);
- wherein the hinge device is configured such that the pair of side walls (31) of the moving link (30) overlap an outside of the pair of side walls (11) of the first hinge body (10);
- wherein the front connecting link (50) has a main part (50$x$) connected to the first hinge body (10), the moving link (30) and the supporting link (60) and a pair of spacers (57) made of resin interposed between the pair of side walls (11) of the first hinge body (10) and the pair of side walls (31) of the moving link (30);

wherein the main part (50$x$) of the front connecting link (50) has a proximal end side connecting portion (51) that enters between the pair of side walls (11) of the first hinge body (10) and is rotatably connected to the front end portion of the first hinge body and an intermediate connecting portion (52) that enters between the pair of side walls (31) of the moving link (30) and is rotatably connected to the intermediate portion of the moving link (30), and at least both sides of the proximal end side connecting portion (51) and the intermediate connecting portion (52) are made of resin, and wherein the pair of spacers (57) extends between the intermediate connecting portion (52) of the main part (50$x$) and the proximal end side connecting portion (51), a pair of slits (58) are formed between both side surfaces of the main part and an inner surface of the pair of spacers, and the pair of side walls (11) of the first hinge body (10) enters the pair of slits.

2. The hinge device as claimed in claim 1, wherein both side surfaces of the intermediate connecting portion (52) and outer surfaces of the pair of spacers (57) are flush with each other.

3. The hinge device as claimed in claim 1, wherein the main part (50$x$) of the front connecting link (50) has a distal end side connecting portion (53) that enters between a pair of side walls (61) of the supporting link (60) and is rotatably connected to the one end of the supporting link, and at least both sides of the distal end side connecting portion are made of resin.

4. The hinge device as claimed in claim 1, wherein the entire front connecting link (50) is made of resin and the main part (50$x$) and the pair of spacers (57) are integrated.

5. A hinge device comprising:
- a first hinge body (10) having a pair of side walls (11),
- a second hinge body (20) provided on a front side of the first hinge body (10) and
- a link mechanism (30) interposed between the first hinge body (10) and the second hinge body (20),
  - the link mechanism (30) comprising:
    - a moving link (30) supported by the first hinge body (10) so as to be movable in a front-rear direction, the moving link (30) having a pair of side walls (31) and a front end portion rotatably connected to the second hinge body (20),
    - a front connecting link (50) having a proximal end portion rotatably connected to a front end portion of the first hinge body (10) and an intermediate portion rotatably connected to an intermediate portion of the moving link (30), and
    - a supporting link (60) having one end rotatably connected to a distal end of the front connecting link (50) and the other end rotatably connected to the second hinge body (20), wherein the hinge device is configured such that the pair of side walls (31) of the moving link (30) overlap an outside of the pair of side walls (11) of the first hinge body (10), and wherein the front connecting link (50) has a main part (50*x*) connected to the first hinge body (10), the moving link (30) and the supporting link (60) and a pair of spacers (57) made of resin interposed between the pair of side walls (11) of the first hinge body (10) and the pair of side walls (31) of the moving link (30); and wherein the front connecting link (50) has a pair of halved members (50*a*, 50*b*) that are assembled together, an storage hole (56) is formed between the pair of halved members, a linear damper (80) is stored in the storage hole and a contact member (81) provided at a distal end of the linear damper is in contact with the front end portion of the first hinge body.

6. The hinge device as claimed in claim 5, wherein the hinge device further comprises a rear connecting link (40) made of resin and the rear connecting link integrally has a proximal end side connecting portion (41) that enters between the pair of side walls (11) of the first hinge body (10) and is rotatably connected to a rear end portion of the first hinge body, a distal end side connecting portion (42) that enters between the pair of side walls (31) of the moving link (30) and is rotatably connected to a rear end of the moving link, and a pair of spacers (45) interposed between the pair of side walls (11) of the first hinge body (10) and the pair of side walls (31) of the moving link (30).

* * * * *